(No Model.) 6 Sheets—Sheet 1.
J. W. CULMER.
PROCESS OF AND APPARATUS FOR GENERATING FUEL GAS.
No. 477,354. Patented June 21, 1892.
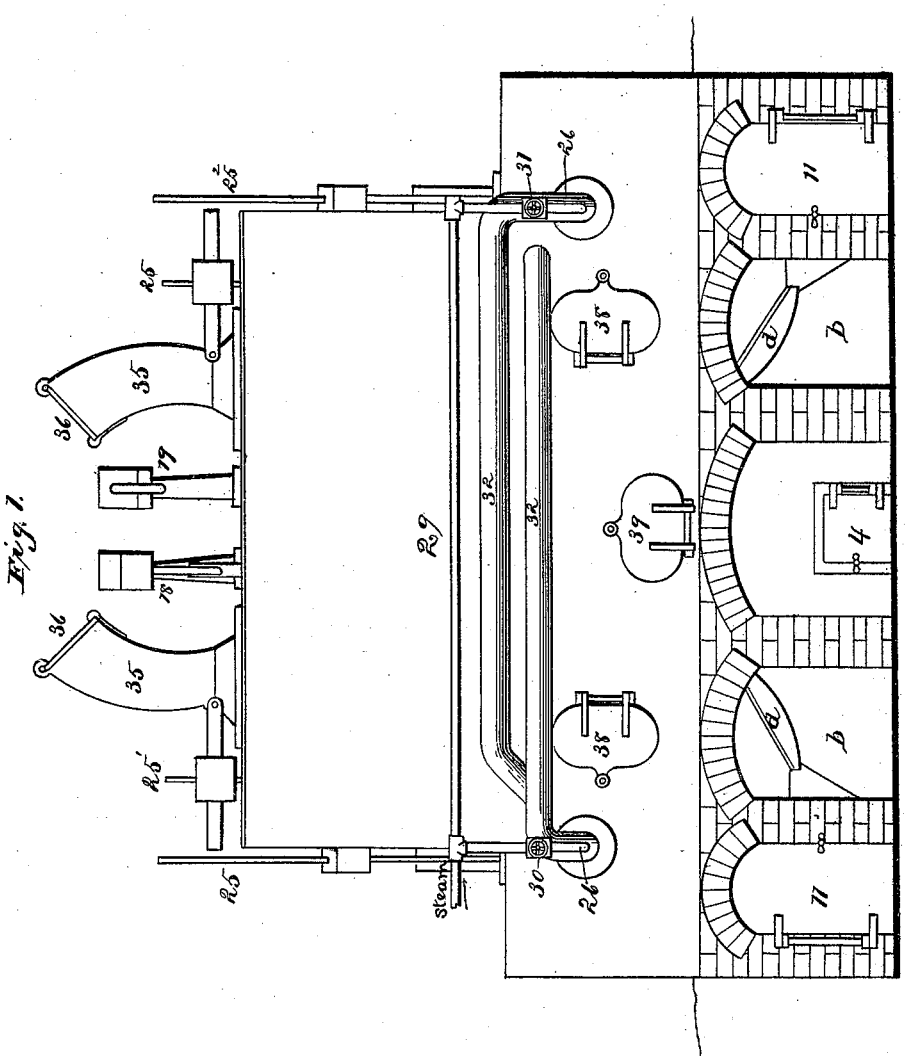

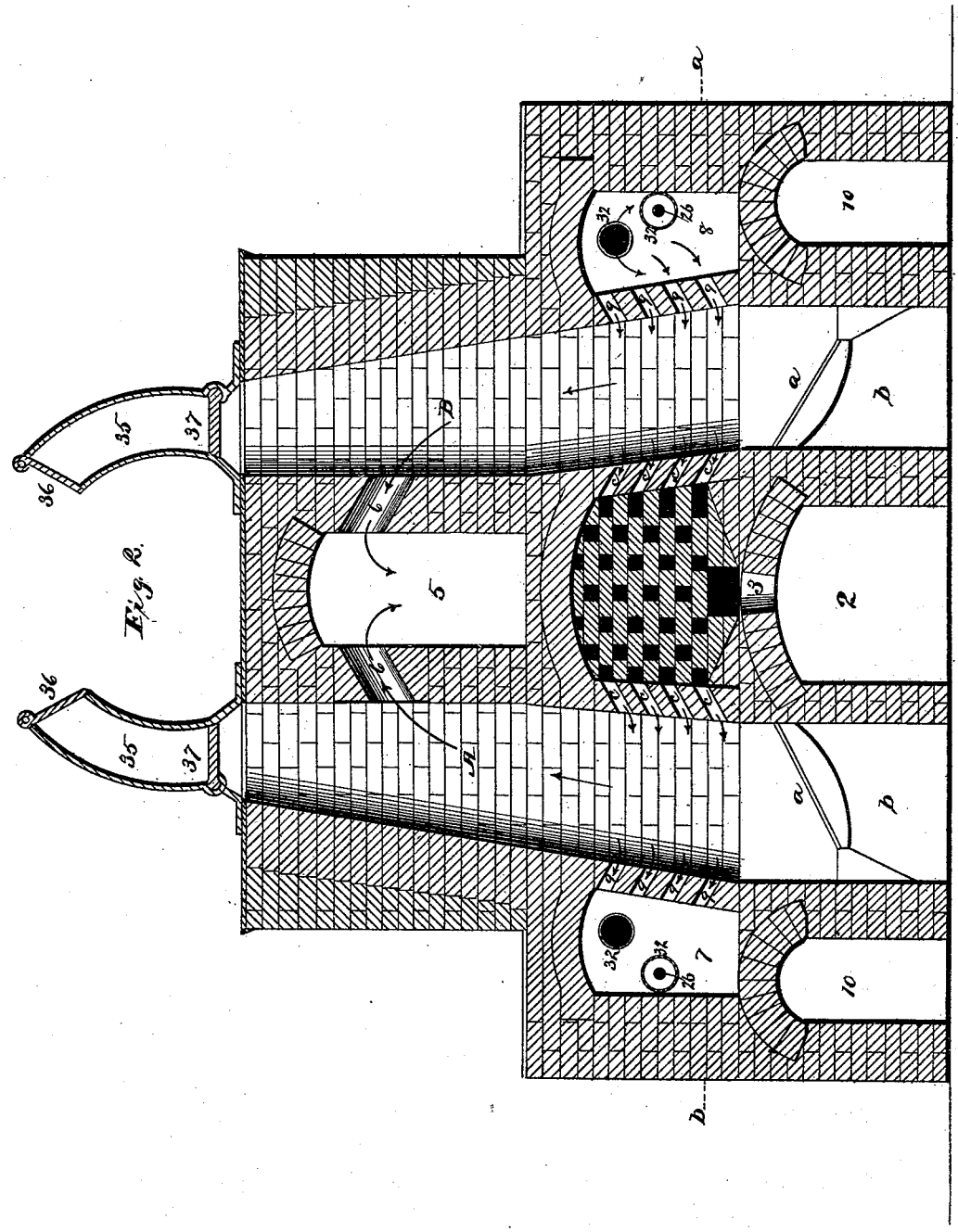

(No Model.) 6 Sheets—Sheet 3.
J. W. CULMER.
PROCESS OF AND APPARATUS FOR GENERATING FUEL GAS.
No. 477,354. Patented June 21, 1892.
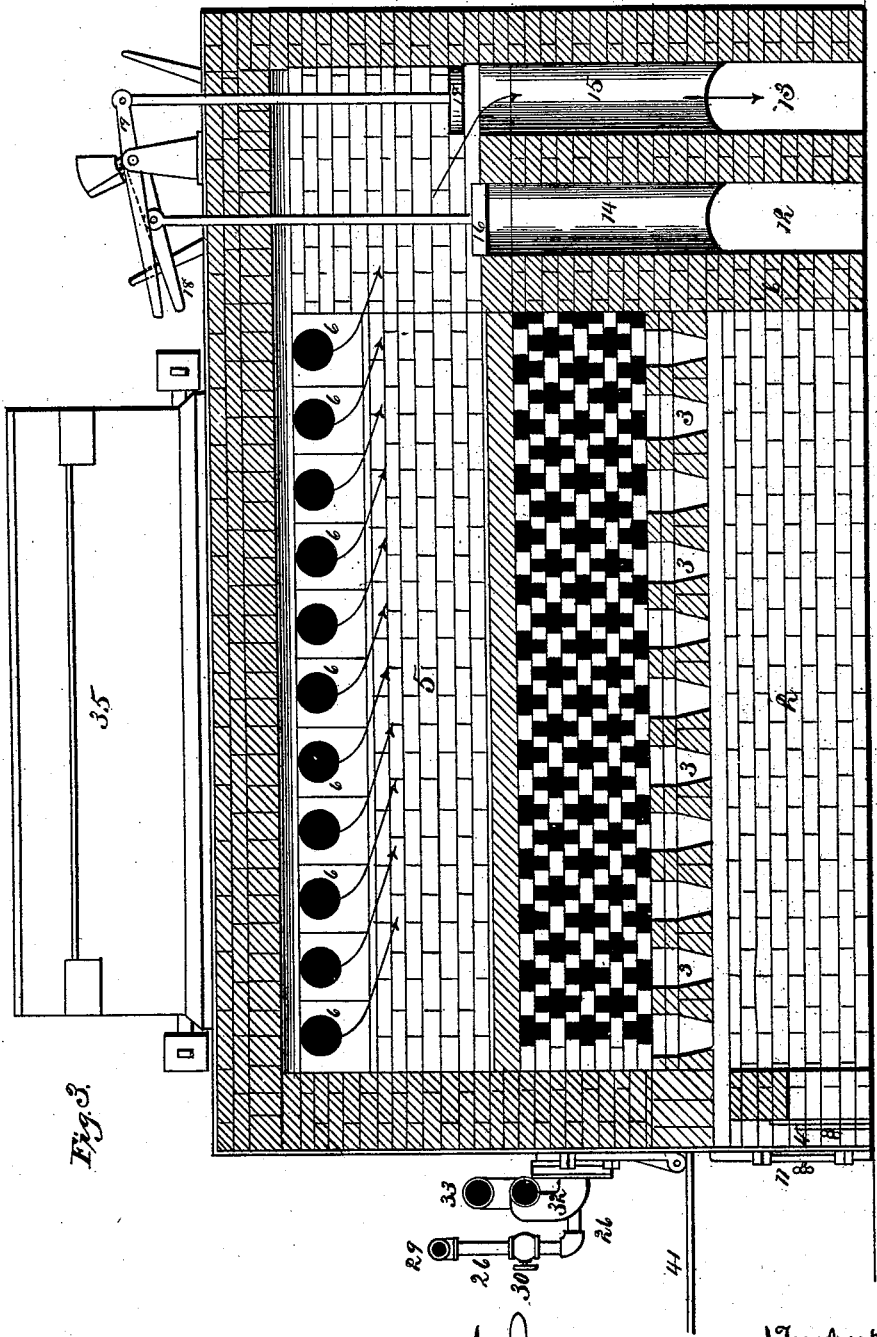

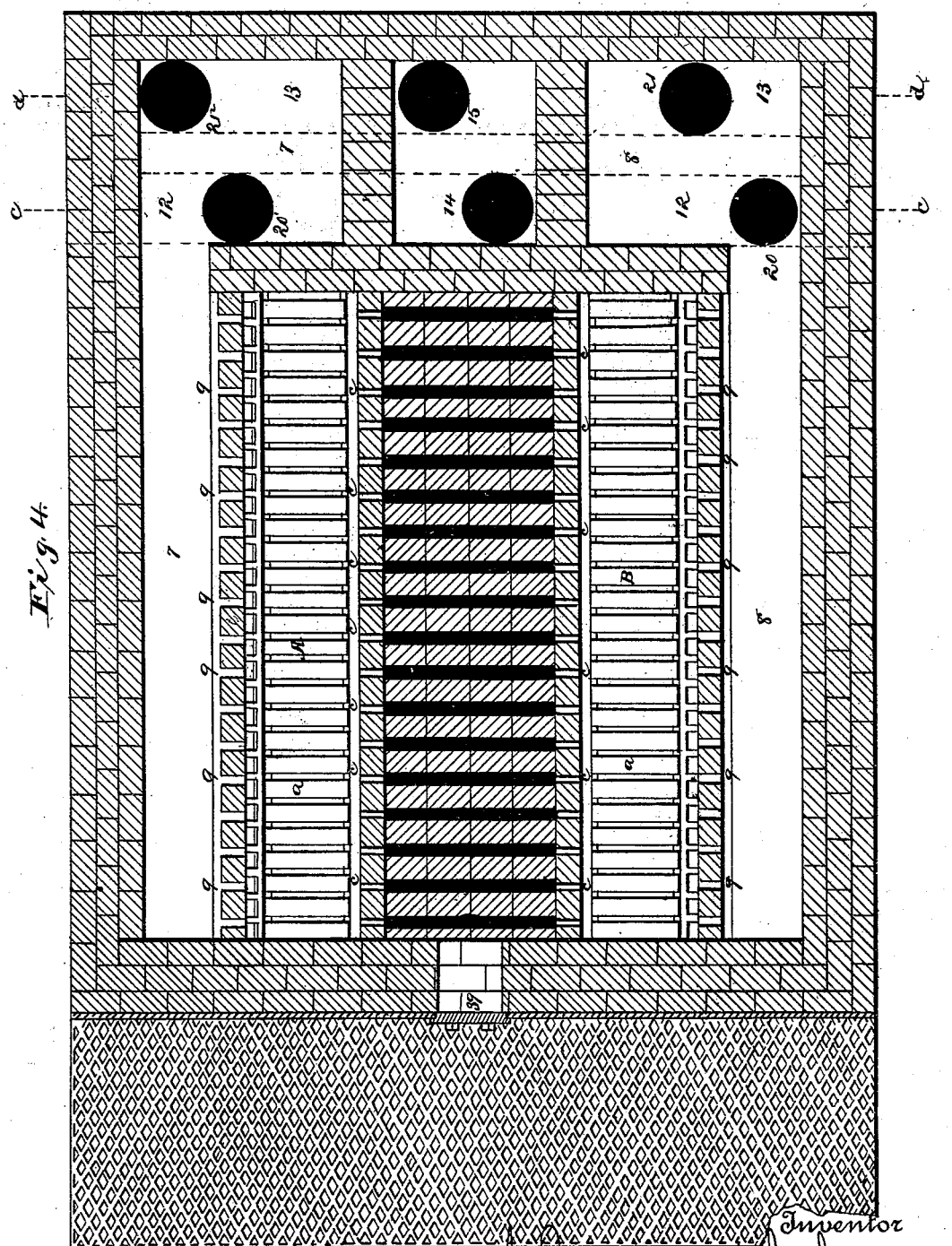

(No Model.) 6 Sheets—Sheet 5.
J. W. CULMER.
PROCESS OF AND APPARATUS FOR GENERATING FUEL GAS.
No. 477,354. Patented June 21, 1892.
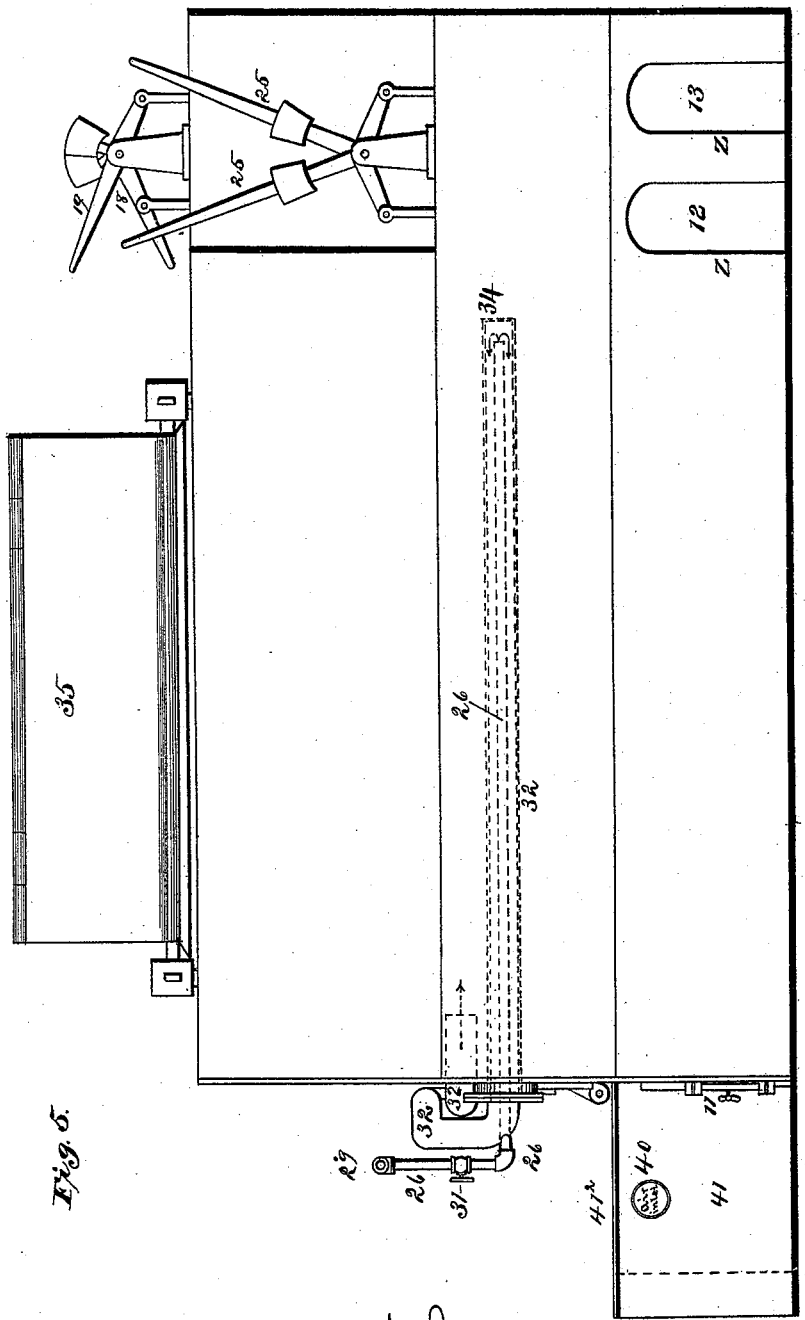

(No Model.) 6 Sheets—Sheet 6.
J. W. CULMER.
PROCESS OF AND APPARATUS FOR GENERATING FUEL GAS.
No. 477,354. Patented June 21, 1892.
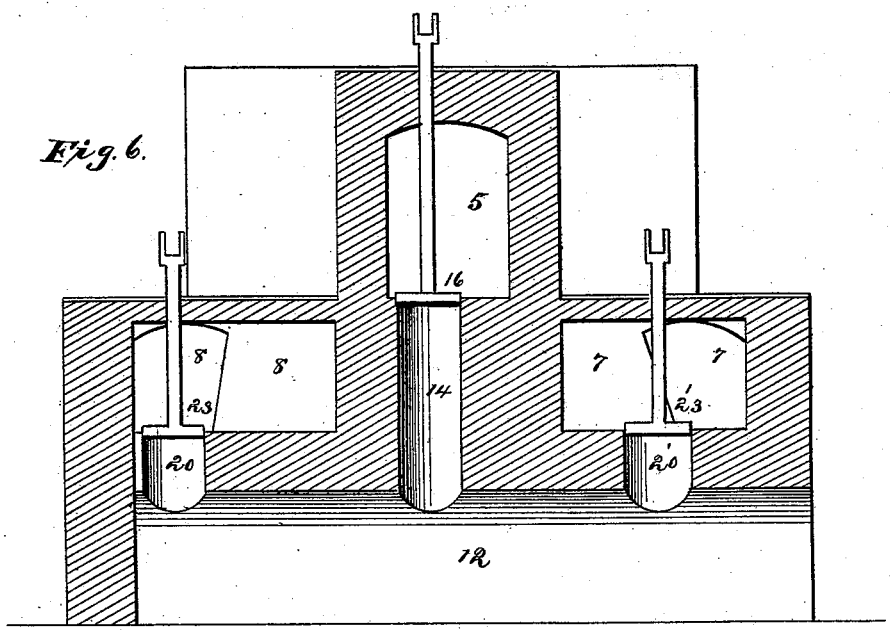
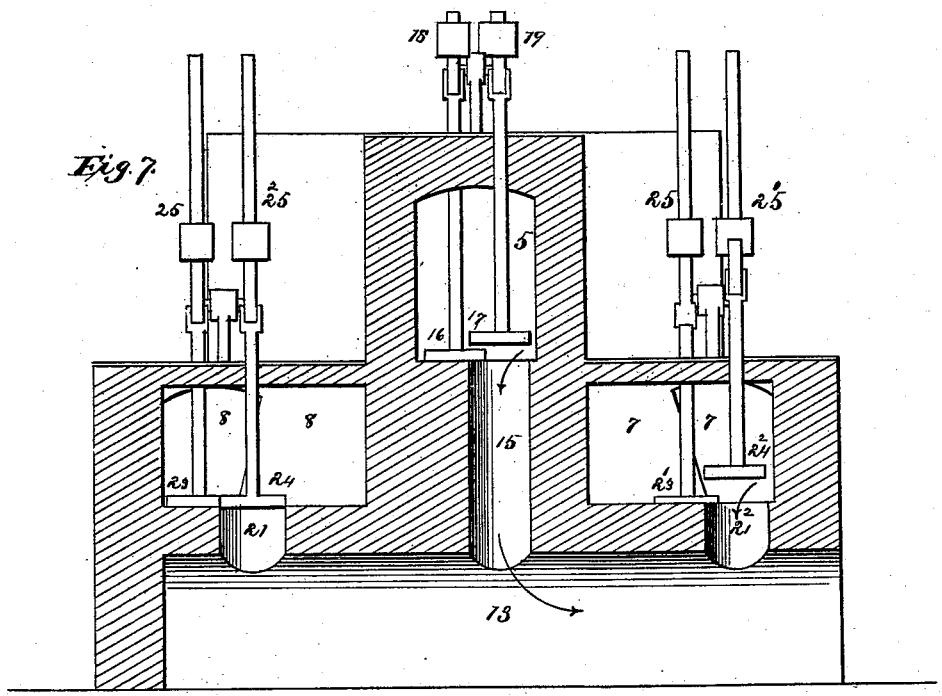

UNITED STATES PATENT OFFICE.

JOHN WOODRUFF CULMER, OF NEW BRIGHTON, PENNSYLVANIA.

PROCESS OF AND APPARATUS FOR GENERATING FUEL-GAS.

SPECIFICATION forming part of Letters Patent No. 477,354, dated June 21, 1892.

Application filed June 12, 1890. Serial No. 355,124. (No model.)

*To all whom it may concern:*

Be it known that I, JOHN WOODRUFF CULMER, a citizen of the United States, residing at New Brighton, in the county of Beaver and State of Pennsylvania, have invented new and useful Improvements in Process of and Apparatus for Generating Fuel-Gas, of which the following is a specification.

My improvements are directed to certain novel constructions and combinations in a fuel-gas producer whereby fuel-gas is generated by subjecting separate and distinct bodies of fuel, respectively, to active and to retarded combustion in separate contiguous chambers having communication with an intermediate checker-work body or regenerator, and also with valve-controlled passages or tunnels along the outer walls of said chambers, which are used alternately as inlet and outlet flues. In such operation the heat from the gas carried off through the outer-wall flue, when used as an outlet-flue, is utilized to superheat a volume of steam for decomposition with the coke of the fuel-beds, or to heat air under pressure for the maintenance of combustion in the fuel-beds. The closing of the valve of one of these side-wall passages which connect with the general gas-flue and the opening of the valve connecting the opposite side-wall passage with the general gas-flue makes the closed passage the inlet. In this way the heat of the highly-heated gas is absorbed by the brick or refractory lining of the said side-wall passage which is being used as an outlet, and this heat is in turn absorbed by the steam or air while said passage is being used as an inlet. In such operation fresh fuel is fed into each fuel-chamber separately at stated times with the object of maintaining in one chamber a mass of fuel in an incandescent state and in the other chamber a mass of fuel in a condition of distillation or of low combustion. It will be understood that these conditions are only approximate and are continually changing, because as the incandescent coke in one chamber is exhausted and falls down it is succeeded by fresh fuel from above, while in the opposite fuel-chamber the distilling-fuel has become exhausted of its hydrocarbons and has in turn become incandescent. At this point the flow of the gas is reversed by the reversal of the valves controlling the communication of the side-wall passages with the general gas-flue and the outlet-passage becomes the inlet, and vice versa. In this operation the gaseous products generated in the chamber, and which are rich in hydrocarbons, are forced by the blast which maintains combustion in that chamber through the checker-work body, which divides the two chambers, through the body of incandescent fuel in the other chamber, from which the hydrocarbons have been almost exhausted, and out through the passage alongside the incandescent fuel to the general gas-flue.

The accompanying drawings illustrate my improved gas-producer, which I will now more particularly describe and will in connection therewith, specifically designate in the claims concluding this specification the matters and things which constitute my improvements.

Referring to the drawings, Figure 1 represents a front elevation of the complete producer. Fig. 2 is a vertical cross-section of the same, showing the relation of the gas-generating chamber to the regenerator checker-work body, the side-wall flues, and the steam-pipes therein. Fig. 3 is a vertical longitudinal section of the same, taken centrally through the checker-work body and the general top outlet-flue, which communicates with the independent generating-chambers. Fig. 4 is a horizontal section taken through the line *a b* of Fig. 2, showing the communicating passages between the checker-work body, the generating-chambers, the side-wall flues, the outlet-wells therefor, and the outlet-wells for the top flue. Fig. 5 is a side elevation. Fig. 6 is a vertical cross-section taken on the line *c c* of Fig. 4, and Fig. 7 is a similar section taken on the line *d d* of Fig. 4.

Upon a suitable foundation two fuel-containing chambers A and B are erected in vertical separated and independent relation to each other, each having an upper outlet through the passages 6 to a top flue 5, and each chamber is provided with a grate *a*, which preferably slopes downward into arched ash-pits *b*, which are open for the admission of air. Between the inner walls of these fuel-containing chambers, and above their grates, I erect a checker-work body of refractory blocks, so as to form interior zigzag flues or spaces disposed so as to communicate with each other in a horizontal direction and to form a series of passages connecting the chambers A and B. This checker-work body rises to a height about equal to that of the incandescent zones of the fuel-chambers and extends parallel with and to the full length of said chambers, and the checker-work spaces communicate with the interior of the fuel-chambers through the downwardly-inclined spaces $c\ c$, (shown in Figs 2 and 4,) by means of which the products of distillation or partial combustion in one fuel-bed are caused to pass through the checker-work into and through the other fuel-bed in a horizontal direction, so that the separate fuel-beds are in perpetual communication with each other through the checker-work, which is thus produced and maintained as an incandescent body. At the bottom this checker-work body has its flue-spaces in communication with a central arched space 2 by vertical passages 3, formed in the arch for the purpose of allowing the dust and ashes carried into the checker-work flues to fall down into the arched space 2, which is closed by a door 4 in its front wall to prevent an upward draft into the checker-work body and to allow the removal of ashes. The placing of this checker-work body between the inner walls of the fuel-chambers gives the advantage of heating such body uniformly and continuously from the incandescent fuel in either chamber alternately, so that the gases in their passage through from one chamber to the other are broken up and intimately mixed and fixed. Above the checker-work body and between the inner walls of the fuel-chambers is constructed a flue 5, which extends from the front to the rear walls of the furnace and communicates with the chambers A and B through the passages 6, and thus forms an outlet-flue for both chambers for the passage of the products of combustion from the producer while starting the operation. At the opposite sides of the furnace and within its walls are formed flues 7 and 8, which are parallel with and join the fuel-chambers, extend from the front to the rear, communicate each with its respective fuel-chamber by downwardly-inclined passages 9 9, and form each in turn an inlet-flue for the admission of a volume of steam, superheated, or of air, into the fuel-beds; or each side flue in turn forms an outlet for the exit of the gases from the producer, as I will more particularly presently describe.

Referring to Fig. 2, it will be seen that the passages $c$ and 9 in the walls of the fuel-chambers slope downward into the chambers to prevent the fuel as it settles down from entering said passages and clogging them. Under the outer flues 7 and 8 the foundation of the structure is formed with arched spaces 10 to permit of the expansion of the brick-work and to give access to the side flues. These spaces 10 are closed by doors 11 to prevent the entrance of air.

Behind the rear walls of the producer and in the foundation thereof are constructed two flue-passages 12 and 13, (seen in Fig. 3,) which extend across the furnace at right angles to the longest side of the fuel-chambers, and which are made to communicate by wells 14 and 15 with the top flue 5 for conveying the gaseous products from both chambers to the place of consumption while the producer is being started. The communication between the top flue 5 and the gas-flues 12 and 13 is controlled by valves 16 and 17, operated by weighted levers 18 and 19, as shown in Figs. 3, 6, and 7, the stems of said valves passing through openings in the top of the producer. The side flue 7 communicates with the general gas-flues through the wells $20'$ and $21^2$, which are controlled by the valves $23'$ and $24^2$, while the side flue 8 communicates with the general gas-flues through the wells 20 and 21, which are controlled by valves 23 and 24, which are operated by weighted levers from the top. The object of operating two parallel general gas-flues 12 and 13 is the heating of an air blast by alternating its passage through said flues with the passage of the gas.

Within the side flues 7 and 8 I arrange pipes 26 for the introduction of live steam. These pipes extend horizontally nearly the length of said flues, are open at their inner ends 28, Fig. 5, and are connected outside at the front with supply-pipe 29, which is controlled by separate valves 30 and 31. These steam-pipes are each inclosed by a larger pipe 32, which is closed at its inner end 34, extends outside said flues and across the front of the producer and enters the front end of the opposite side flue, wherein the steam passes from the open end of said pipe 32. In this way the steam-blast is superheated in the pipe in flue 7 when the latter is an outlet-flue and escapes into flue 8 when the latter is an inlet-flue, and vice versa. At the top the furnace is fitted with fuel-charging hoods 35, having self-closing valves 36 at their receiving ends and self-closing weighted valves 37 at their discharging ends, so as to prevent the entrance of air into the chambers and the exit of gas from them while charging.

For convenience in making repairs and for inspection the fuel-chambers are fitted at their front ends with doors 38 to give access thereto for cleaning and to prevent bridging of the fuel. In like manner a front door 39 is fitted for access to the flues of the checker-work body for cleaning and for repairs.

Air under pressure from a fan or other well-known method of blast is admitted through an inlet-pipe 40, Fig. 5, into the closed space 41, into which the ash-pits $b$ of the fuel-chambers open, and while I prefer to operate this producer by the use of air under pressure from below the grates and to use the pipes 26 and 27 for blasting with superheated steam, yet it is obvious that air may be injected through these pipes instead of steam, or that similar pipes may be added for the use of air in connection with steam.

The outer walls of the fuel-chambers are inclined inwardly, so that the sectional areas of such chambers are greatest at the point of the greatest expansion of fuel.

In operating the furnace all the valves are closed except the valve 16, through which the upper outlet-flue 5 communicates by the well 14 with the general gas-flue 12. Fires are kindled upon the grates and the combustion is hastened in chamber A until the fuel-bed is in an incandescent state, while in chamber B the fuel-bed has been kept low in volume or quantity of fuel until that in chamber A has become highly heated, when chamber B is charged with fresh fuel, so that it contains a large body of fuel in a low state of combustion. Up to this time combustion has been maintained by air from below the grates, and the products of combustion have passed off from both chambers by the passages 6, through the top flue 5, down the well 14, to the general gas-flue.

In explanation of the foregoing I may say that this operation is devoted simply to the obtaining of two fuel-beds in proper condition for the continuous operation of the two generators, wherein combustion is maintained by means of air entering from the inlet-pipe 40 and passes upward through both grates. In one generator a very small or low bed of fuel is maintained on the grate, while the other generator has a full charge of fuel, which is gradually brought to a state of incandescence. At this point the low or small quantity of fuel in one generator is augmented by a full charge, and the two generators thus have incandescent fuel in one and fuel in a low state of combustion in the other. The passages are now opened and closed in the way described and the continuous process begins, the air from the inlet-pipe 40 still passing in below both grates equally and assists in supporting combustion in both fuel-beds. The body of the fuel in the chamber A being now coke in a more or less incandescent state and the body of the fuel in the chamber B being at a comparatively low point of distillation or combustion, the valve 16 is closed and the valve 23' opened. A blast of steam, air, or both is now turned on at the valve 31, and entering flue 8 passes through the fuel-bed in the chamber B, through the checker-work between the fuel-chambers and through the incandescent fuel in chamber A, thence out through the flue 7, down the well 20', to the general gas-flue. As this operation proceeds the fuel in the bed of chamber B becomes incandescent and exhausted of its available gases, while that in chamber A, having been burned and passed through the grate as ashes, is replaced from above with fresh fuel, and the direction of the blast is reversed, valve 23' being now closed, and valve 23 is opened, for it will be observed that while the superheated steam is blasted through these two bodies of fuel alternately from either side there is an admission or air under pressure from below the grate to maintain combustion in both fuel-bodies, and so bring about the incandescent condition in each of these bodies alternately. It will be seen, therefore, that the blasting of the superheated steam from the side of the fuel-body in low combustion carries with it gases which are the product of the distillation of that fuel, and that these gases are thoroughly mixed within the checker-work and thoroughly fixed in their passage through the higher-heated body of fuel farthest from the blast. Flue 7 thus becomes the inlet-passage by the closing of the blast-valve 31, while by opening valve 30 the flue 8 becomes the outlet-passage for the gases by the passage to the well 20 to the general gas-flue. The gases are thus carried by the blast from a fuel-bed rich in carbon through a checker-work, where they are broken up and mixed and through a bed of incandescent fuel.

Under ordinary circumstances the incandescent-fuel bed would add largely carbonic acid, while the low-combustion bed of fuel would add largely rich hydrocarbons, much of which would condense as coal-tar; but by this process the carbonic acid of the incandescent fuel takes up an additional atom of carbon from the rich carbonaceous gas passing through it from the low-combustion-fuel bed, and the total yield is greater in volume of available gas and of a more uniform quality.

The carbonic acid hereinbefore referred to means the carbonic acid produced by the action of the air upon the fuel at or near the incandescent point and also the carbonic acid produced by the dissociation of the superheated steam within the incandescent-fuel bed.

The bed of fuel is maintained at a point as nearly as possible up to the flue-inlets 6 6 with the object of having a heavy top layer of unkindled fuel as a seal above the combustion-zones of the fuel-containing chambers.

By the construction herein set forth the passages 12 and 13 are used alternately for the passage of the gaseous products from the generator, the one passage being used for a blast of air to be mingled with the gas at the point of consumption.

It is an advantage in the utilization of any fuel-gas that it shall be cooled below the point at which it leaves the generators to a considerably-decreased temperature and consequently decreased volume in order that in the combustion it may give up its heat in a lesser space and so produce greater intensity. It is also an advantage that the air which unites with the fuel-gas at the point of combustion shall be heated as nearly as possible to the temperature desired within the furnace or other place of combustion. Both these results are obtained by the parallel flues 12 and 13. The heated gases from the generators are passed through the flue 12 to the point of combustion, giving up their heat to the brick-work or lining of the flue until it has become highly heated, while at the same time cold air has been passing through the flue 13 to the point of combustion. The controlling-valves of these flues are now reversed and the hot gases are turned into the cold flue 13, while the cold air is turned into the heated flue 12, and for the admission of cold air these flues are provided with doors at their open ends z z, which are farthest from the point of combustion, as seen in Fig. 5. As the fuel is fed from the top and consumed near the bottom of the chambers, the producer is, when in continuous operation, practically "downdraft," as the products of combustion from the fresh fuel must pass downward through the underlying layers of partially-converted or incandescent fuel.

Referring particularly to the alternating operation of the fuel-containing chambers, it will be observed that the retarding of the combustion of the fuel in one chamber and the active combustion in the other chamber is important because it always provides fuel which is wholly incandescent in one chamber and in the other fuel which is only partially burned or distilled. It is this provision which gives the advantage of passing the blast of air or steam, or both, through two bodies of fuel, one incandescent and the other only partially burned. This process alternating, as stated, causes the carbonic acid from the incandescent fuel in a highly-heated state to receive from the carbon under distillation another equivalent of carbon and becomes carbonic oxide, and is thereby converted from a useless into a useful gas. It causes the hydrogen dissociated from the steam to give up its equivalent of oxygen, which is united with a further portion of the carbon in the second generating-chamber. It causes the comparatively fresh fuel upon the top of the bed in both chambers to be carried down through the highly-heated fuel, and thus a lower percentage of carbonic acid and of nitrogen is obtained, and consequently a more valuable gas, from a given fuel. It causes the gases to be drawn down into both beds of fuel. It causes the heated surfaces with which the gas is brought into contact to be maintained at a uniform degree of heat, and finally this alternating operation of the generating-chambers causes the gas produced to be more uniform as to quality and temperature than any system or gas-producer of which I have knowledge.

I claim as my improvements—

1. A fuel-gas producer consisting, essentially, of two separate and distinct fuel-containing chambers, a checker-work body between and adjoining the inner wall of said chambers and communicating therewith at said walls, flues at the outer walls of said chambers and communicating therewith on a plane with said checker-work body, an outlet-flue centrally above said checker-work body, communicating with both chambers, and means for controlling the said side and central flues, substantially as described, for the purpose specified.

2. A fuel-gas producer consisting, essentially, of two separate and distinct fuel-containing chambers, a checker-work body between and joining the inner walls of said chambers and communicating therewith at said walls, an outlet-flue centrally above said checker-work body, communicating with both said chambers, flues at the outer walls of said chambers, communicating therewith on a plane with said checker-work body, steam-superheating jacketed pipes within said side flues, the pipes of one flue being heated therein and delivering steam into the other flue, and valves for controlling the said side and center flues and the said steam-pipes, substantially as described, for the purpose specified.

3. In a fuel-gas producer, the combination, with two separate and independent fuel-containing chambers, each having communication with an outlet-flue common to both, of a checker-work body between the inner walls of said chambers, communicating with the latter through downwardly-inclined passages c in said walls and having communication with a bottom-closed archway through openings 3 all along the bottom of said body, substantially as described.

4. In a fuel-gas producer, the combination of the separate and independent fuel-containing chambers, the side flues 7 and 8, communicating therewith by the downwardly-inclined passages 9 in the outer walls of said chambers, with a checker-work body communicating on each side with said chambers by the downwardly-inclined passages c in the inner walls of said chambers, valve-controlled jacketed steam-pipes 32, opening into said side flues, and a top outlet-flue 5, having communication with both chambers, the said side flues and checker-work body being in the same horizontal plane, and suitable valve-controlled outlet-passages for the said flues, substantially as described, for the purpose specified.

5. The herein-described process of generating fuel-gas, the same consisting in subjecting in separate and distinct chambers bodies of fuel respectively and continuously to active and to retarded combustion and at the same time introducing superheated steam into the fuel-bed having the retarded combustion, passing the resultant gases into and through an incandescent checker-work body and into and through the fuel-bed having the active combustion, and thence into the outlet-flue, and alternating or reversing the said operations in the generators to render the production continuous, in the way described.

In testimony whereof I have hereunto set my hand in the presence of two subscribing witnesses.

JOHN WOODRUFF CULMER.

Witnesses:
A. E. H. JOHNSON,
PHILIP F. LARNER.